United States Patent
Liang et al.

(10) Patent No.: US 9,242,646 B2
(45) Date of Patent: Jan. 26, 2016

(54) ENGINE TORQUE IMBALANCE COMPENSATION IN HYBRID VEHICLE

(71) Applicant: FORD GLOBAL TECHNOLOGIES, LLC, Dearborn, MI (US)

(72) Inventors: Wei Liang, Farmington Hills, MI (US); Xiaoyong Wang, Novi, MI (US); Rajit Johri, Ann Arbor, MI (US); Mark Steven Yamazaki, Canton, MI (US); Ryan Abraham McGee, Ann Arbor, MI (US); Ming Lang Kuang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 45 days.

(21) Appl. No.: 14/157,868

(22) Filed: Jan. 17, 2014

(65) Prior Publication Data

US 2015/0203105 A1    Jul. 23, 2015

(51) Int. Cl.
| | |
|---|---|
| *B60W 20/00* | (2006.01) |
| *B60L 15/20* | (2006.01) |
| *B60K 6/48* | (2007.10) |
| *B60W 10/08* | (2006.01) |

(52) U.S. Cl.
CPC ................. *B60W 20/50* (2013.01); *B60K 6/48* (2013.01); *B60L 15/20* (2013.01); *B60W 10/08* (2013.01); *B60W 2510/0661* (2013.01); *Y10S 903/903* (2013.01)

(58) Field of Classification Search
CPC ................ B60W 20/50; B60W 10/08; B60W 2510/0661; B60L 15/20; B60K 6/48
USPC .......................................................... 701/22
See application file for complete search history.

(56) References Cited

U.S. PATENT DOCUMENTS

| | | | | |
|---|---|---|---|---|
| 5,574,217 | A * | 11/1996 | McCombie | ................ 73/114.04 |
| 6,837,320 | B2 * | 1/2005 | Wakashiro et al. | ........ 180/65.26 |
| 6,943,460 | B2 | 9/2005 | Wakashiro et al. | |
| 7,665,558 | B2 | 2/2010 | Akimoto et al. | |
| 7,765,857 | B2 * | 8/2010 | Suzuki | ....................... 73/114.04 |
| 8,041,502 | B2 | 10/2011 | Akimoto | |
| 2013/0174806 | A1 * | 7/2013 | Nagakura | ..................... 123/296 |
| 2013/0190962 | A1 | 7/2013 | Yokouchi et al. | |

* cited by examiner

*Primary Examiner* — Richard Camby
(74) *Attorney, Agent, or Firm* — David B. Kelley; Brooks Kushman P.C.

(57) ABSTRACT

A system and method for controlling a fraction motor in a hybrid vehicle includes varying a traction motor torque in response to an engine cylinder misfire. The traction motor torque is varied to compensate for an engine torque shortfall due to the engine cylinder misfire, reducing a torque imbalance caused by the misfire.

17 Claims, 3 Drawing Sheets

ENGINE TORQUE IMBALANCE COMPENSATION IN HYBRID VEHICLE

TECHNICAL FIELD

The disclosure relates to hybrid vehicles having an engine and a traction motor and varying torque provided by the motor during engine misfires.

BACKGROUND

A hybrid electric vehicle includes an engine and a traction motor, each with a torque delivery path to traction wheels. The engine includes a plurality of cylinders within which combustion takes place to produce torque on a crankshaft. Under some circumstances, a cylinder may misfire, or produce reduced torque or no torque. If a cylinder continuously misfires, a torque imbalance arises among the cylinders, leading to variations in the torque provided to the crankshaft.

SUMMARY

A system and method for controlling a traction motor in a hybrid vehicle includes varying a traction motor torque to compensate for an engine torque shortfall due to an engine cylinder misfire.

In one embodiment, varying a traction motor torque to compensate for a torque shortfall includes increasing or decreasing the traction motor torque in response to the difference between a nominal engine output torque profile and an actual engine output torque profile. In another embodiment, varying a fraction motor torque to compensate for a torque shortfall includes commanding a traction motor to provide a first torque pulse having a first magnitude and a second torque pulse having a second magnitude, the second magnitude being varied from the first magnitude in response to an engine speed variation. In yet another embodiment, the method further includes synchronizing a traction motor torque pulse with an engine crankshaft position corresponding to a misfiring cylinder. In a further embodiment, the method further includes presenting an alert to an operator indicative of the engine cylinder misfire.

A hybrid electric vehicle includes an engine having a plurality of cylinders, a traction motor, and a controller. The controller is configured to command the traction motor to provide a compensation torque in response to an engine torque shortfall due to an engine cylinder misfire.

In one embodiment, the compensation torque is a torque pulse having a same magnitude and same phase as a nominal engine cylinder firing pulse. In another embodiment, the controller is further configured to vary a phase and a magnitude of the compensation torque in response to an engine speed variation. In yet another embodiment, the controller is further configured to provide an alert to an operator indicative of the engine cylinder misfire.

In one embodiment, the detected torque imbalance includes a detected nonfiring cylinder. In such an embodiment, cyclically varying a traction motor torque comprises commanding the fraction motor to provide a torque pulse having a magnitude equal to a nominal cylinder firing torque and a phase synchronized with a crankshaft position corresponding to the detected nonfiring cylinder. In another embodiment, the detected torque imbalance includes a detected underperforming cylinder. In such an embodiment, cyclically varying a traction motor torque comprises commanding the traction motor to provide a first torque pulse having a first magnitude and a subsequent second torque pulse having a second magnitude. The second magnitude is varied from the first magnitude in response to an engine speed variation.

Embodiments according to the present disclosure provide a number of advantages. For example, the present disclosure provides a method for using a traction motor to provide a compensating torque in response to a misfiring cylinder to prevent noise, vibration, and harshness, which reduce driver satisfaction.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
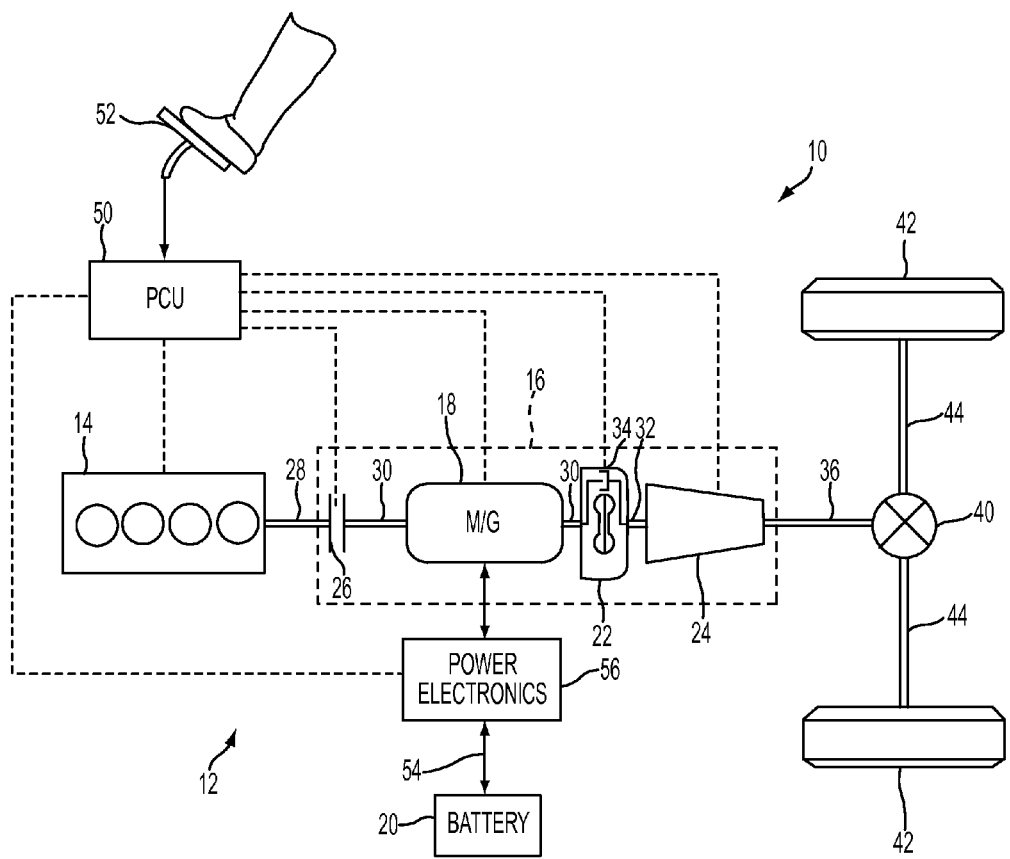
FIG. 1 is a schematic illustration of a hybrid electric vehicle having a modular powertrain configuration.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline or diesel engine and includes a plurality of engine cylinders. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque $\tau_e$ through the disconnect clutch 26 to the M/G 18, and then from the M/G 18 through the torque converter 22 and gearbox 24. The M/G 18 may assist the engine 14 by providing an additional motor torque $\tau_m$ to turn the shaft 30. The combined torque provided to the shaft 30 may be obtained from the equation $$\tau_{shaft} = \tau_e + \tau_m$$

This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2A:
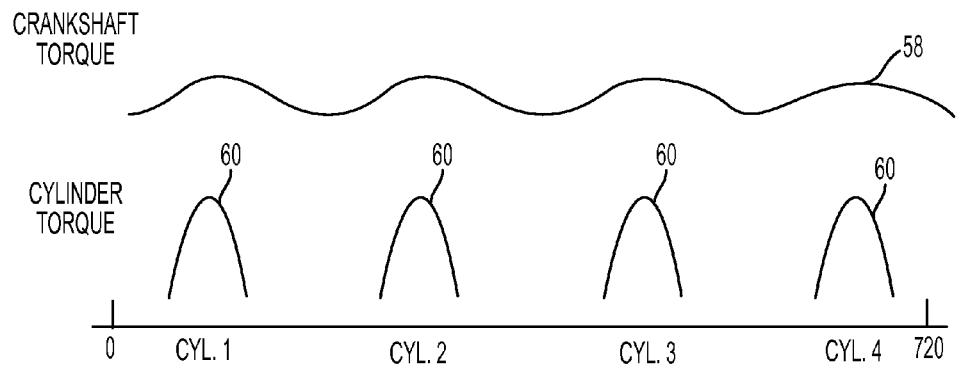
FIG. 2*a* is a diagram illustrating torque delivery of engine cylinders during normal engine operation.

Referring to FIG. 2a, a diagrammatic representation of engine cylinder torque and crankshaft output torque during normal engine operation is shown. In this embodiment, the engine 14 includes four cylinders. As the crankshaft 28 rotates through 720 degrees, each cylinder produces a torque pulse 60 due to combustion in the associated cylinder. The cyclical torque pulses of each cylinder act on crankshaft 28 to produce a combined crankshaft torque 58. The crankshaft torque 58 includes a small torque variation, as shown, due to the cyclical torque pulses. Similarly, a crankshaft speed will include a small amount of variation due to the cyclical torque pulses.

In some circumstances, a cylinder in the internal combustion engine may misfire, or provide incomplete combustion or no combustion. When a cylinder misfire occurs repeatedly, the engine speed varies due to the unbalanced torque delivery among the cylinders. This may impair drivability of the vehicle due to noise, vibration, and harshness ("NVH") introduced by the torque imbalance. Various known methods and devices enable the detection of identification of misfiring engine cylinders. For example, an ion sensor may be used to generate a signal indicative of combustion quality and timing.

Figure 2B:
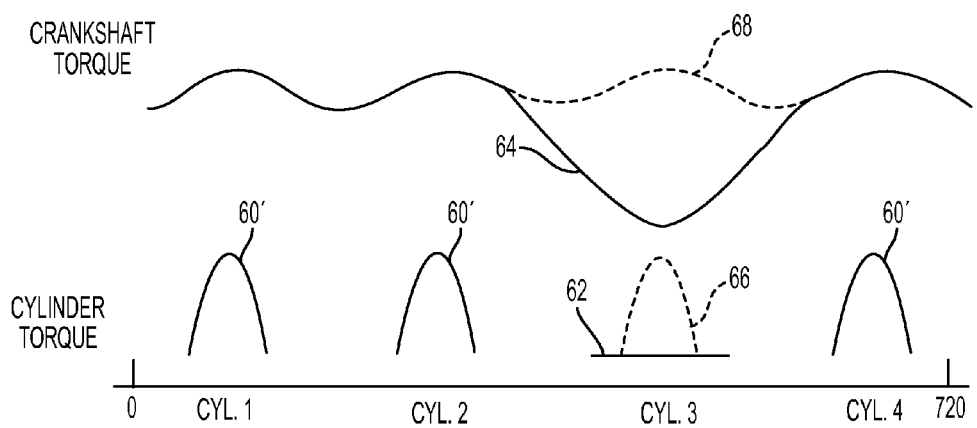
FIG. 2*b* is a diagram illustrating torque delivery of engine cylinders during a cylinder misfire.

Referring to FIG. 2b, a diagrammatic representation of engine cylinder torque and crankshaft output torque during normal an engine misfire is shown. As the crankshaft 28 rotates through 720 degrees, cylinders 1, 2, and 4 each provide a torque pulse 60'. Due to the misfire, cylinder 3 produces no torque or reduced torque, as illustrated by 62. Consequentially, a combined crankshaft torque 64 will experience a torque shortfall when the misfiring cylinder would produce torque under normal engine operations. If the cylinder misfires repeatedly, this cyclical torque shortfall may cause NVH, as discussed above.

As discussed above, in hybrid driving mode the torque imposed on the shaft 30 is a sum of the engine torque and a motor torque. The M/G 18 may thus be commanded to provide a motor torque pulse 66 to compensate for the cyclical torque shortfall. This may be achieved because the M/G 18 has a relatively high bandwidth, such that motor torque may be varied to emulate the torque pulse provided by cylinder combustion. Consequentially, the engine torque imposed on the shaft 30 may be supplemented by the motor torque pulse 66 to create a combined torque 68. The torque pulse 66 should be generally equal in magnitude and phase to a nominal cylinder combustion torque pulse under normal engine operation. The combined torque 68 may thus be closely matched with a nominal engine crankshaft torque, as illustrated by 58 in FIG. 2a.

The torque pulse may be implemented as a variance from a base motor torque. In other words, in steady state hybrid driving mode the M/G 18 may be providing a motor torque $\tau_{m,1}$ to shaft 30. In response to a misfire, the motor torque $\tau_m$ may be cyclically increased from and decreased back to $\tau_{m,1}$ according to the magnitude and phase of the nominal cylinder combustion torque pulse to provide the motor torque pulse 66.

To closely match the magnitude and phase of the motor torque pulse 66 with a nominal cylinder combustion torque pulse, it is helpful to synchronize an angular position of the M/G 18 with an angular position of the crankshaft 28. As discussed above, in hybrid driving mode a clutch 26 rigidly connects the crankshaft 28 and the M/G 18. A certain amount of angular displacement may however occur between the crankshaft 28 and the M/G 18 during hybrid driving mode due to a harmonic damper fitted to the crankshaft 28. One method of synchronizing the angular position of the M/G is to calculate an angular displacement according to $$\theta = (\alpha_t - \alpha_0) - (\beta_t - \beta_0)$$

where $\alpha_0$ and $\beta_0$ are the initial positions of the crankshaft 28 and the M/G 18, respectively, when the clutch 26 is engaged, and $\alpha_t$ and $\beta_t$ are the instantaneous angular positions of the crankshaft 28 and the M/G 18, respectively. The calculated angle provides a relative position of the crankshaft 28 and the M/G 18. Other synchronization methods may of course be used.

In the example shown FIG. 2b, cylinder 3 fails to combust and produces no torque, as illustrated at 62. This may occur, for example, if a spark plug fails to ignite. Other types of misfires include non-optimal combustion leading to a reduced cylinder combustion torque pulse. This may occur, for example, if a fuel injector provides an incorrect quantity of fuel. In such circumstances, commanding M/G 18 to provide a motor torque pulse 66 that is equal in magnitude to a nominal cylinder combustion torque pulse may overcompensate and lead to an imbalanced combined torque profile. Therefore it may be desirable to provide a feedback system that varies the magnitude of the motor torque pulse 66. Such a system may vary the magnitude of the motor torque pulse in response to a detected crankshaft speed variation, for example. Such a system could also be configured to vary the magnitude of the motor torque pulse in response to other measured values indicating a torque imbalance.

Figure 3:
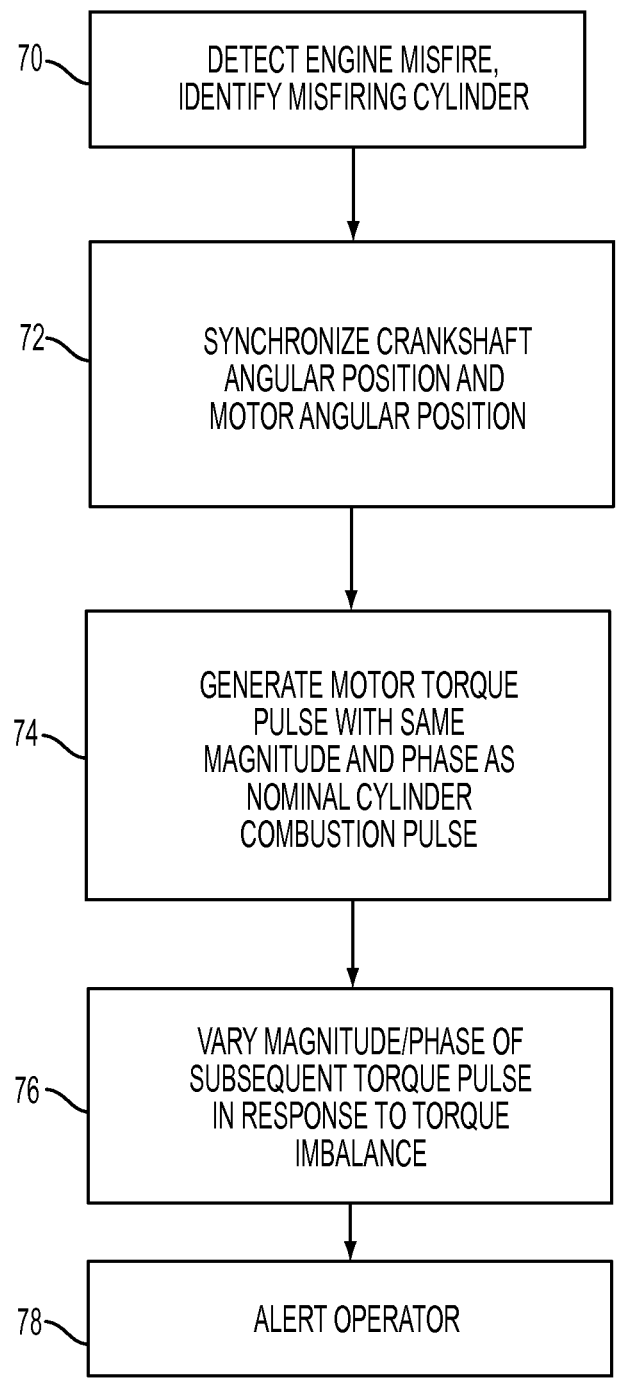
FIG. 3 is a flowchart illustrating a method of controlling an engine in a hybrid vehicle.

Referring to FIG. 3, a flowchart is shown illustrating logic for controlling a motor in a hybrid vehicle. An engine misfire is detected and the misfiring cylinder is identified, as illustrated at block 70. As discussed above, this may be performed using a variety of methods. The motor and crankshaft angular positions are then synchronized, as illustrated at block 72. A motor is then commanded to provide a motor torque pulse with the same magnitude and phase as a nominal cylinder combustion pulse, as illustrated at block 74. The phase and/or magnitude of subsequent pulses may be varied in response to a measured torque imbalance, as illustrated at block 76. This may include, for example, a feedback system that varies pulse magnitude in response to a shaft speed variation. An alert is then signaled to a vehicle operator, as illustrated at block 78. The alert may indicate that an engine misfire has occurred or otherwise prompt the operator to service the vehicle.

Variations of the above logic are, of course, possible. For example, the first motor torque pulse may be commanded with a different magnitude than a nominal cylinder combustion pulse. The magnitude of the first motor torque pulse may be determined based on the detected type of misfire, for example.

As can be seen from the various embodiments, the present invention provides a method for varying a motor torque to compensate for a torque shortfall due to a cylinder misfire, reducing NVH which would reduce driver satisfaction.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method for controlling a traction motor in a hybrid vehicle, the method comprising:
varying a traction motor torque in response to an engine crankshaft position to compensate for an engine torque shortfall due to an engine cylinder misfire.

2. The method of claim 1, wherein varying a traction motor torque to compensate for a torque shortfall comprises increasing or decreasing the traction motor torque in response to a difference between a nominal engine output torque profile and an actual engine output torque profile.

3. The method of claim 1, wherein varying a traction motor torque to compensate for a torque shortfall comprises commanding a traction motor to provide a first torque pulse having a first magnitude and a second torque pulse having a second magnitude, the second magnitude being varied from the first magnitude in response to an engine speed variation.

4. The method of claim 1, further comprising synchronizing a traction motor torque pulse with an engine crankshaft position corresponding to a misfiring cylinder.

5. The method of claim 1, further comprising presenting an alert to an operator indicative of the engine cylinder misfire.

6. A hybrid electric vehicle comprising:
an engine having a plurality of cylinders;
a traction motor; and
a controller configured to command the traction motor to provide a compensation torque based on a crankshaft position in response to an engine torque shortfall due to an engine cylinder misfire corresponding to the crankshaft position.

7. The hybrid electric vehicle of claim 6, wherein the compensation torque is a torque pulse having a same magnitude and same phase as a nominal engine cylinder firing pulse.

8. The hybrid electric vehicle of claim 6, wherein the controller is further configured to vary a phase and a magnitude of the compensation torque in response to an engine speed variation.

9. The hybrid electric vehicle of claim 6, wherein the controller is further configured to provide an alert to an operator indicative of the engine cylinder misfire.

10. A method for controlling a traction motor in a hybrid electric vehicle comprising:
cyclically varying a traction motor torque based on an crankshaft position to provide a compensating torque in response to a detected torque imbalance among a plurality of engine cylinders.

11. The method of claim 10, wherein the detected torque imbalance includes a detected nonfiring cylinder.

12. The method of claim 11, wherein cyclically varying a traction motor torque based on an engine crankshaft position comprises commanding the traction motor to provide a torque pulse having a magnitude equal to a nominal cylinder firing torque and a phase synchronized with a crankshaft position corresponding to the detected nonfiring cylinder.

13. The method of claim 10, wherein the detected torque imbalance includes a detected underperforming cylinder.

14. The method of claim 13, wherein cyclically varying a traction motor torque based on an engine crankshaft position comprises commanding the traction motor to provide a first torque pulse having a first magnitude and a subsequent second torque pulse having a second magnitude, the second magnitude being varied from the first magnitude in response to an engine speed variation.

15. The method of claim 1, wherein the engine torque shortfall due to an engine cylinder misfire includes a cyclic engine torque shortfall due to a repeating engine cylinder misfire.

16. The hybrid electric vehicle of claim 6, wherein the engine torque shortfall due to an engine cylinder misfire includes a cyclic engine torque shortfall due to a repeating engine cylinder misfire.

17. The method of claim 10, wherein the detected torque imbalance includes a cyclic engine torque shortfall due to a repeating engine cylinder misfire.

* * * * *